United States Patent Office 3,809,623
Patented May 7, 1974

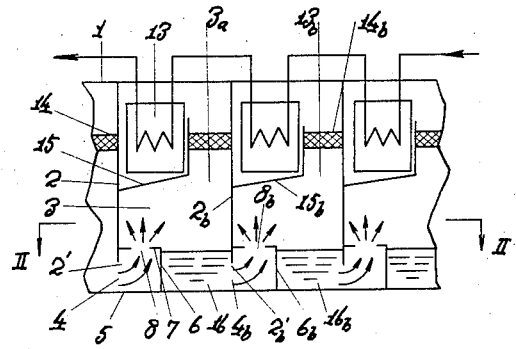

3,809,623
EVAPORATING METHOD AND EVAPORATING
APPARATUS
Tetsugoro Sasakura and Takashi Kurosaka, Hyogo, Japan, assignors to Sasakura Engineering Co., Ltd., Osaka, Japan
Filed Mar. 5, 1971, Ser. No. 121,449
Claims priority, application Japan, Mar. 9, 1970, 45/19,281
Int. Cl. B01d 3/06
U.S. Cl. 203—11                    15 Claims

ABSTRACT OF THE DISCLOSURE

A multi-stage flash type evaporating apparatus and method, in which a series of plural throttles are provided at any or each brine flow passage between adjacent stages and the opening area ratio between the throttles is restricted within a certain range. A part of the throttles may be arranged to form a box with one throttle opened on its upper surface. The box may have a peripheral wall extending thereabove.

BACKGROUND OF THE INVENTION

This invention relates to a multi-stage flash type evaporating method and apparatus to produce fresh water from sea water, brackish water or other aqueous solutions by distillation.

In a multi-stage flash type evaporating apparatus, while heated feed solution (hereinafter referred to as "brine") is passed through multi-stage evaporating chambers which are maintained at successively lower pressure from stage to stage, the brine causes flash evaporation under the pressure in the evaporating chamber of each stage, thus lowering its pressure to that in the succeeding stage of evaporating chamber due to pressure drop which takes place when the brine passes through a throttle provided at a brine flow passage between stages, and such flash evaporation is repeated in each stage of evaporating chambers. Thus, the flow condition of the evaporating brine in the apparatus is a very important factor for operation of the apparatus.

In the conventional apparatus of this kind, in order to improve evaporating efficiency of brine flowing through the throttle where flash evaporation is caused and to maintain liquid sealing between stages having pressure difference by the proper brine level, the device is so designed, for example, that a weir is provided in the downstream side of a throttle between stages or a baffle plate is provided above the throttle for changing the flow direction of flashing vapor and brine, thereby preventing brine, together with generated steam, from being blown up violently by flashing vapor. In either case, the throttle for causing flash evaporation is provided at only one portion between adjacent stages.

In the apparatus having the above-mentioned structure, it has often been experienced that the depth of brine remaining on the bottom of the evaporating chamber tends to be affected directly by the pressure difference between the upstream and downstream sides of the throttle and the brine flow rate therethrough, and even a slight change of the load makes the depth of the brine smaller than the height of the upper end of the opening of the throttle, with the result that liquid sealing between stages is broken and the operation of the apparatus becomes unstable or impossible.

In addition to the above, the evaporating apparatus provided with only the weir has a defect that the brine, at the point of flash evaporation, scatters highly and widely at high speed, accompanied by the generated vapor, with the result that the brine impinges violently against a bottom plate of the condenser built in the evaporating chamber and corroding the structural material of the bottom plate. Particularly in the case where the length of the evaporating chamber in the direction of the brine flow has to be made comparatively short due to the arrangement of tube bundles of the condenser, the brine flow rate and so on, the brine also impinges violently against the partition between stages of the downstream side and causes corrosion of the structural material of this part. In order to prevent such corrosion, it is necessary to use thick structural material or to use considerably expensive material of high anti-corrosion character. Furthermore, because of the large quantity of generated brine drops in the spraying state and high level of the height to which they reach, the amount of liquid drops reaching a mist-separator provided generally at the vapor entrance of the condenser and entrained with the flashing vapor, becomes large and so the amount of liquid drops causes a low purity of distilled water. In order to eliminate such defects, the height of the evaporating chamber has to be made large and accordingly an apparatus of larger size must be used.

In the case where a downward baffle plate is provided as above mentioned for preventing such defects, the evaporating brine is immediately introduced under the liquid surface of the brine which remains in the bottom part of the evaporating chamber and the flashing brine stays for only a short time in the space part of the evaporating chamber, with the result of poor evolving or separation of vapor from residual brine and thus the lowering of evaporating efficiency. This tendency becomes conspicuous with an increase in the number of stages in the evaporating apparatus and the decrease in the temperature difference and the pressure difference between stages. On the other hand, however, in case that the temperature difference and the pressure difference are large, there may be the danger that the structural material of the bottom plate is corroded due to the brine impinging against the bottom plate of the evaporating chamber.

SUMMARY OF THE INVENTION

This invention, while avoiding the above defects in the conventional apparatus of this kind, provides a new evaporating method and an apparatus for the same, wherein the operation is stable without causing a change of brine level in the evaporating chamber relative to a load variation of the apparatus, the evaporating efficiency is high and also the structural material is not corroded.

BRIEF DESCRIPTION OF THE DRAWINGS

The nature and advantages of the present invention will be made more clear from the following descriptions made with reference to the accompanying drawings, in which:

FIG. 1 is a partial explanatory view showing one of the embodiments of this invention.

FIG. 2 is a cross section, taken on the line II—II of FIG. 1.

FIG. 3 is a sectional view of another embodiment corresponding to FIG. 2.

FIG. 4 is an enlarged sectional view of the part 6 in FIG. 1.

FIG. 5, FIG. 6 and FIG. 7 are sectional views, respectively, of other embodiments corresponding to FIG. 4.

DETAILED DESCRIPTION OF THE INVENTION

Figure 6:
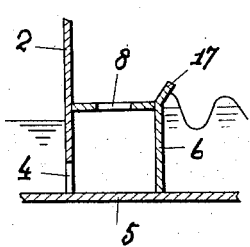

This invention can be provided in various forms. The attached drawings and the explanation hereinafter made describe several embodiments thereof. The explanation hereinafter made discloses several instances of the principle of this invention, but this invention is not limited to these embodiments. The technical scope of this invention will be disclosed in the claims to be made hereinafter.

In FIG. 1 and FIG. 2, a shell 1 of the multi-stage flash evaporating apparatus is divided into plural evaporating chambers 3 which are maintained at lower pressure from stage to stage with many partitions 2. An opening is provided at the lower part of each partition 2 which forms a brine passage 2' between adjacent stages and a first throttle 4 which are concerned with the generation of flash evaporation. The brine passage and first throttle can be formed in such a way that by curving or bending a bottom plate 5 of the evaporating chamber near the partition 2 adjoining evaporating chambers are made to communicate with each other. A box 6 is provided at the exit side of the brine of the first throttle 4, wherein box 6 communicates with the evaporating chamber of the preceding stage through the first throttle. A second throttle 8 which is concerned with the generation of flash evaporation, is opened at the upper surface of the box 6. The ratio of the area of the opening $A_2$ of the second throttle 8 (the total area, if composed of a plurality of openings) to the area of the opening $A_1$ of the first throttle 4 (the total area, if composed of a plurality of openings), namely $A_2/A_1$ should be within the range of 0.8–2.3, preferably 0.8–1.4, because of the reasons given hereinafter.

A box 6 is shown in square shape in the drawings, but can take other shapes as desired. Further, the second throttle 8 is shown as having one opening in FIG. 1 and FIG. 2, but if the capacity of the apparatus is large and the brine flow rate is high, the second throttle may be composed, as shown in FIG. 3, of a plurality of openings 9 spaced appropriately, and the first throttle may also be composed of a plurality of openings. In addition, it is desirable that the second throttle 8 be positioned in such a fashion that it does not make close contact with the partition 2 between stages and the side wall 10, 11 of the evaporating chamber, in other words, circumference 12 of the opening of the second throttle is spaced from the partition and side walls. At the upper part of an evaporating chamber 3, a condenser 13 and a mist separator 14 are built in, in the same way as in the case of the conventional multi-stage evaporating apparatus. Numeral 15 denotes a bottom plate of the condenser and numeral 16 denotes the brine well in the bottom of the evaporating chamber.

In a manner similar to that of the conventional multi-stage flash type evaporating method and the apparatus therefor, in this invention the flash evaporation is to be repeated by circulating the brine continuously through a series of evaporating chambers ranging from a stage of relatively high temperature and high pressure to a stage of lower temperature and lower pressure, wherein the brine in one evaporating chamber 3a flows into a box 6b with the pressure thereof somewhat reduced when the brine passes the first throttle part 4b of the brine passage 2'b opening in a partition 2b between the evaporating chamber 3a and the next evaporating chamber 3b, it generates vapor of a quantity corresponding to the degree of the pressure drop, thereby producing a two-phase flow of liquid and vapor, which then passes through the second throttle 8b provided at the upper surface of a box 6b and its pressure is further reduced to the pressure in the evaporating chamber 3b, whereupon it flashes upwards into the evaporating chamber 3b and causes flash evaporation. The vapor produced by flash evaporation ascends as it is separated from the residual brine and after its entrained liquid drops are removed by a mist separator 14b, it enters into a condenser 13b to condense to water which is collected on the bottom of the condenser and is taken out as distilled water. The remained brine flows into a brine well 16b at the bottom of the evaporating chamber and then enters into the evaporating chamber of the next stage for repeating flash evaporation.

In the present invention, as mentioned above, the first throttle and the second throttle are provided at the brine passage between adjacent stages to restrict the brine flow passage, and the flash evaporation in each evaporating chamber is caused by both of the two throttles. As the pressure difference between adjoining stages is decreased twice, that is first by the first throttle and then by the second throttle, the pressure difference across the second throttle which causes the brine to flash into the evaporating chamber, is smaller than the pressure difference between stages. On the other hand, in the conventional method whereby flash evaporation is caused by only one throttle, the pressure difference across the throttle is substantially the same as the pressure difference between stages. Therefore, the pressure difference across the second throttle of the present invention is small and since the flow at this part is two-phase flow, the area of the opening of this throttle is much larger than that of the conventional throttle. According to the present invention, therefore, the mass velocity of fluid to be flashed into the evaporating chamber could be made much smaller than usual. Accordingly, this arrangement can prevent the fluid, particularly the brine remaining after evaporation, which is flashed into the evaporating chamber, from moving to a long distance at high speed. In other words, fluid is flashed gently into the space of the evaporating chamber at comparatively low height and in a comparatively large expanse. For this reason, the present invention does not involve corrosion due to violent impingement of brine against the bottom plate of the condenser, the partition between stages, at the downstream side or the bottom plate of the evaporating chamber, and there is no need for using special constructional material for these parts. Moreover, the quantity of brine drops entrained in the vapor and the height to which the brine drops reach is smaller, with the result of better purity of distilled water. In the conventional method the apparatus must be made larger to eliminate these defects, whereas in the present invention there is no need of making the apparatus larger. Moreover, as the brine is distributed in a wide extension into the space of the evaporating chamber, evolving or separation of vapor from brine is made easy and high evaporating efficiency can be obtained. Furthermore, since the present invention produces considerable effect and is very simple in construction, the practical use of the present invention produces a highly economical operation.

If the construction is such that the circumference 12 of the second throttle 8 opened at the upper surface of the box 6 is spaced from the partition 2 between stages and side walls 10, 11 of the evaporating chamber 3, as described above, while the danger of brine spouted into the evaporating chamber impinging against the wall surface and consequently causing corrosion is considerably decreased the spread of flashed fluid inside the evaporating chamber 3 is not restricted by these wall surfaces, with the result of better spread of flashed fluid and greater evaporation efficiency of the present invention. Moreover, as shown in FIG. 5 and FIG. 6, if a peripheral wall 17 which protrudes upwardly beyond the upper surface of the box 6 is provided at the circumference of the upper surface of the box 6, brine remaining after evaporation in the brine well at the bottom part of the evaporating chamber which would reach the level of the second throttle part 8 due to fluctuations of the liquid level of the brine, is prevented from being blown up into the evaporating chamber again by the brine from the preceding stage which flashes from the throttle part.

Figure 7:
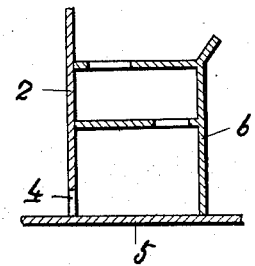

The foregoing is an explanation of the present invention in the case where two throttles, the first and the second, to cause flash evaporation are provided at the fluid passages between stages. However, more throttles, for example, the third and the fourth throttles, could be provided according to various conditions, such as pressure difference between stages, construction of the apparatus and so on. The same effect as mentioned before can be expected from such increased throttles. FIG. 7 shows one embodiment in which three throttles are used.

As the most important and essential point of the present invention, it must be stressed particularly that as a result of our experiments for a long time in the present invention, using a large experimental apparatus of practical scale having a distilled water making capacity of 66 tons/day, it has been confirmed that the present invention has very important operational characteristics as mentioned below.

Generally, the relation as shown by the following formula is found between the flow rate Q (of fluid flowing through the throttle) and the pressure difference $H_L$ across the throttle.

$$Q_a H_L^n \quad (1)$$

Suppose the passing fluid is a single-phase flow of liquid alone, the value of $n$ in the Formula 1 is ½ and the following formula is established.

$$Q_a H_L^{\frac{1}{2}} \quad (2)$$

In the case of the conventional multi-stage flash evaporating apparatus having only one throttle part at the brine flow passage, before the brine passes through the throttle, it is not evaporated at all and is a single-phase flow of liquid alone. Therefore, the above Formula 2 can be applied thereto as it is. Even if two or more throttles are provided at the fluid passage so long as the fluid passing through the throttle is always a single-phase flow of liquid alone, it is needless to say that the Formula 2 can be applied to the throttle as a whole.

However, in the case of the present invention, the brine which is in saturated condition in the preceding evaporating chamber of comparatively high pressure and high temperature, flows into the next evaporating chamber of lower pressure and lower temperature, passing through two or more throttles. Accordingly, the brine causes partial evaporation immediately after passing through the first throtle and produces vapor, in other words, it is no longer a single-phase flow of liquid alone but is a two-phase flow of liquid and vapor, which passes through the second throttle. In this case, the value of $n$ in the above Formula 1 is smaller than ½ and the relation between Q and $H_L$ will be:

$$Q_a H_L^n, \quad n < \frac{1}{2} \quad (3)$$

Figure 8:
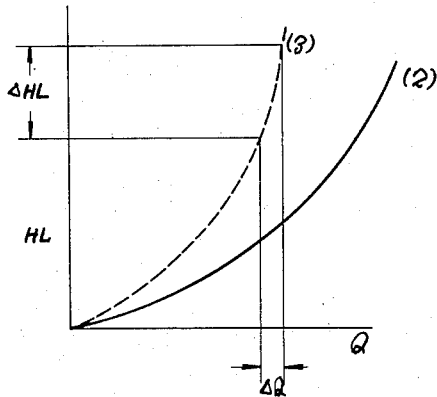
FIG. 8 is a curve showing the relation between brine flow rate and pressure difference at the front and the back of the throttle.

FIG. 8 illustrates the above Formulae 2 and 3. As is obvious from FIG. 8, in the case of the Formula 3, if the pressure difference $H_L$ across the throttle (corresponding to the pressure difference between stages) reaches a certain value, the change ($\Delta Q$) of flow rate Q is only very slight even if a large variation of the pressure difference ($\Delta H_L$) exists. Therefore, in the construction of the present invention having two or more throttles, even if the pressure difference across the throttle or the difference in pressure between stages varies, there is very small change in the flow rate of brine which flows through the stages, with the result of a substantially constant liquid level of the brine and stabilized normal operation of the apparatus.

Figure 9:
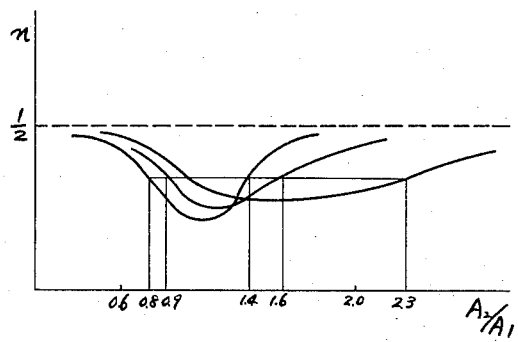
FIG. 9 is a curve showing the effect of the ratio of the areas of the openings of the throttles.

On the curve of the Formula 3 shown in FIG. 8, the smaller the value of $n$, the steeper the slope of the curve and the more the effect which was mentioned above. However, it has been confirmed by experiments that the value of $n$ is chiefly governed by the ratio of the area of the opening $A_2$ of the second throtle to the area of the opening $A_1$ of the first throttle, i.e., $A_2/A_1$. Further studies of this correlation between the value of $n$ and the value of of $A_2/A_1$ by making many experiments, have revealed that so long as the value of $A_2/A_1$ (ratio of areas of the opening) is within the range of 0.8–2.3, preferably 0.8–1.4, as summarized in three curves in FIG. 9, the value of $n$ becomes the smallest, with the result that the brine level shows no substantial change and the operation of the apparatus is kept stable, although it varies to some extent according to the size, shape, etc. of the box 6. Moreover, so long as the value of $A_2/A_1$ is within the value mentioned above, the best spread of spouted brine in the evaporating chamber and the low height of brine reaching can be obtained, which eliminates effectively such defects as experienced with the conventional apparatus, i.e., corrosion of constructional material and lowering of the purity of the distilled water. Thus, the apparatus according to the present invention makes it possible to maintain the most stabilized operation. Therefore, the proper value of $A_2/A_1$ (the ratio of the areas of the opening ofthe second throttle to the first throttle) should be within the range of 0.8–2.3, preferably 0.8–1.4.

As mentioned above, in the present invention more than two throttles can be provided and in this case it has been confirmed by experiments that if the area of the opening of the throttle where the brine which has been substantially in single-phase flow is converted into two-phase flow of liquid and vapor is expressed by $A_1$ and the area of the opening of the throttle having the smallest opening among the throttles where fluid substantially in two-phase passes through is expressed by $A_2$, the value of $A_2/A_1$ should be 0.8–2.3, preferably 0.9–1.6. In this case, therefore, the same effect as mentioned above can be obtained. As mentioned before, those ratios of the areas of the opening of the throttles are essentially important points of the present invention.

From the foregoing, it will be understood that the present invention makes is possible to manufacture a multi-stage flash type evaporating apparatus of stabilized operation, high efficiency, high durability and low cost.

What is claimed is:

1. In a multi-stage flash type evaporating process for evaporating brine, wherein the brine is successively passed into the evaporating chambers of a plurality of stages, the pressure of each succeeding stage being less than the preceding stage, the improvement wherein said brine is passed from each stage to the succeeding stage of lower pressure by the steps comprising:
    passing said brine through a first throttle of a passage having therein a plurality of throttles and partially flash evaporating said brine to obtain a two-phase flow of liquid and vapor;
    passing said two-phase flow through a second throttle of said passage, and further flash evaportaing the liquid of said two-phase flow, into the evaporating chamber of said succeeding stage;
    collecting the vapor in said evaporating chamber, and condensing said vapor to form distilled water;
    collecting the unvaporized brine in said succeeding stage to be passed to the next succeeding stage; and
    maintaining the ratio of the area of the opening of said second throttle to the area of the opening of said first throttle from 0.8 through 2.3.

2. The improvement claimed in claim 1, wherein said ratio is maintained from 0.8 through 1.4.

3. The improvement claimed in claim 1, wherein said brine is passed between adjacent stages through more than two throttles each of which cause partial flash evaporation of said brine, and wherein the ratio of the area of the opening of the throttle, other than the first of said throttles, having the smallest opening to the area of the opening of said first of said throttles is maintained from 0.9 through 1.6.

4. In a multi-stage flash type evaporating system for evaporating brine and including a plurality of stages separated by partitions, each of said stages having an evaporating chamber, means to collect and condense evaporated vapor, and means to collect unevaporated brine, each of said stages being maintained at a succeedingly lower pressure, and there being means between adjacent stages to pass said brine from each stage to the next succeeding stage at lower pressure;

the improvement wherein:

said means to pass said brine between adjacent stages comprises:

a first throttle means positioned between adjacent stages for partially flash evaporating said brine to thus form a two-phase flow of liquid and vapor as said brine passes from one stage to the next succeeding stage of lower pressure;

at least one second throttle means positioned downstream of said first throttle means for further flash evaporating the liquid of said two-phase flow into the evaporating chamber of said next succeeding stage; and the ratio of the area of the opening of the one of said second throttle means having the smallest opening to the area of the opening of said first throttle means being from 0.8 through 2.3.

5. The improvement claimed in claim 4, wherein said ratio is from 0.9 through 1.6.

6. The improvement claimed in claim 4, wherein said first and second throttle means are located in a rectangular box-shaped structure between adjacent stages.

7. The improvement claimed in claim 6, wherein the extreme downstream one of said second throttle means is positioned in an upper surface of said box-shaped structure and opens into the evaporation chamber of said succeeding stage.

8. The improvement claimed in claim 7, wherein the periphery of said throttle means positioned in said upper surface is spaced from said partition separating said adjacent stages and the outer side walls of said succeeding stage.

9. The improvement claimed in claim 7, further comprising a wall means extending upwardly from said upper surface of said box-shaped structure around the periphery thereof to prevent brine from said succeeding stage from entering said extreme downstream throttle means.

10. The improvement claimed in claim 4, wherein said at least one second throttle means comprises a single second throttle means for further flash evaporating the brine in said two-phase flow.

11. The improvement claimed in claim 10, wherein said ratio is from 0.8 through 1.4.

12. The improvement claimed in claim 10, wherein said first and second throttle means are located in a rectangular box-shaped structure between adjacent stages.

13. The improvement claimed in claim 12, wherein said single second throttle means is positioned in an upper surface of said box-shaped structure and opens into the evaporation chamber of said succeeding stage.

14. The improvement claimed in claim 13, wherein the periphery of said second throttle means positioned in said upper surface is spaced from said partition separating said adjacent stages and the outer side walls of said succeeding stage.

15. The improvement claimed in claim 13, further comprising a wall means extending upwardly from said upper surface of said box-shaped structure around the periphery thereof to prevent brine from said succeeding stage from entering said single second throttle means.

References Cited

UNITED STATES PATENTS

| | | | |
|---|---|---|---|
| 3,630,851 | 12/1971 | Kawaguchi | 202—173 |
| 2,759,882 | 8/1956 | Worthen et al. | 202—174 |
| 3,213,000 | 10/1965 | Ewing | 202—173 |
| 3,595,757 | 7/1971 | Izumi | 202—173 |
| 3,399,118 | 8/1968 | Williamson | 202—173 |
| 3,489,650 | 1/1970 | Williamson | 202—173 |
| 2,934,477 | 4/1960 | Seegfried | 202—174 |

FOREIGN PATENTS

| | | | |
|---|---|---|---|
| 1,184,512 | 3/1970 | Great Britain | 202—173 |

U.S. Cl. X.R.

203—71, 88; 202—173

WILBUR L. BASCOMB, Jr., Primary Examiner